United States Patent
Müller et al.

(10) Patent No.: US 9,554,499 B2
(45) Date of Patent: Jan. 31, 2017

(54) AGRICULTURAL IMPLEMENT MOUNTING

(71) Applicant: AGCO International GmbH, Hesston, KS (US)

(72) Inventors: Thomas Müller, Marktoberdorf (DE); Benno Pichlmaier, Munich (DE); Jakob Kreitmayr, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 90 days.

(21) Appl. No.: 14/576,987

(22) Filed: Dec. 19, 2014

(65) Prior Publication Data

US 2015/0201546 A1  Jul. 23, 2015

(30) Foreign Application Priority Data

Dec. 20, 2013  (GB) .................................. 1322771.5

(51) Int. Cl.
  *A01B 59/042* (2006.01)
  *A01B 59/00* (2006.01)
  *A01B 69/00* (2006.01)

(52) U.S. Cl.
  CPC .......... *A01B 59/002* (2013.01); *A01B 59/042* (2013.01); *A01B 69/003* (2013.01); *A01B 69/004* (2013.01)

(58) Field of Classification Search
  None
  See application file for complete search history.

(56) References Cited

U.S. PATENT DOCUMENTS

| | | | | |
|---|---|---|---|---|
| 6,804,587 | B1 * | 10/2004 | O Connor ............. | E02F 9/2045 342/357.31 |
| 7,054,731 | B1 * | 5/2006 | Lange .................. | A01B 69/008 172/4.5 |
| 7,142,956 | B2 * | 11/2006 | Heiniger ................ | G05D 1/027 180/9.1 |
| 7,225,891 | B2 * | 6/2007 | Gehring ............. | B62D 15/0285 180/14.2 |
| 7,689,354 | B2 * | 3/2010 | Heiniger ............... | A01B 69/008 701/412 |
| 7,835,832 | B2 * | 11/2010 | Macdonald .......... | A01B 69/008 701/24 |
| 7,885,745 | B2 * | 2/2011 | McClure .............. | G01C 21/005 701/408 |
| 8,494,726 | B2 * | 7/2013 | Peake .................. | A01B 69/008 701/23 |
| 8,825,263 | B1 * | 9/2014 | Nelson, Jr. ....................... | 701/25 |

(Continued)

FOREIGN PATENT DOCUMENTS

EP  1193582 A1  4/2002

OTHER PUBLICATIONS

Intellectual Property Office, Search Report dated Jun. 23, 2014, for UK Application No. GB1322771.5.

*Primary Examiner* — Truc M Do

(57) ABSTRACT

An agricultural vehicle has an implement connection hitch which is moveable relative to a rear axle of the vehicle. A system for controlling movement of the connection hitch is coupled with position sensors such as a GPS receiver. During turning maneuvers, the control system moves the hitch relative to the rear axle of the vehicle until it reaches an offset position such as to reduce the turning circle of the vehicle and a connected implement. The extent of offset may be determined automatically by the control system on identification of a connected implement.

15 Claims, 7 Drawing Sheets

(56) References Cited

U.S. PATENT DOCUMENTS

| | | | | |
|---|---|---|---|---|
| 8,924,099 B2* | 12/2014 | Nelson, Jr. | ............ | A01C 21/00 701/50 |
| 9,002,565 B2* | 4/2015 | Jones | ................... | E02F 9/2045 342/357.39 |
| 2002/0125018 A1* | 9/2002 | Bernhardt | ............ | A01B 59/068 172/439 |
| 2002/0134558 A1* | 9/2002 | Bernhardt | ............ | A01B 69/004 172/7 |
| 2003/0208311 A1* | 11/2003 | McClure | ............. | A01B 69/004 701/50 |
| 2004/0124605 A1* | 7/2004 | McClure | ............. | A01B 69/004 280/456.1 |
| 2006/0282205 A1* | 12/2006 | Lange | .................... | G01C 21/20 701/50 |
| 2006/0288681 A1* | 12/2006 | Kuzub | .................. | A01D 34/86 56/14.9 |
| 2008/0269988 A1* | 10/2008 | Feller | .................. | A01B 69/007 701/41 |
| 2009/0326763 A1* | 12/2009 | Rekow | ................. | A01B 69/006 701/42 |
| 2010/0084147 A1* | 4/2010 | Aral | ..................... | A01B 69/004 172/1 |
| 2010/0256871 A1* | 10/2010 | Mitchell | .............. | A01B 69/004 701/42 |
| 2010/0324772 A1* | 12/2010 | Aral | ..................... | A01B 69/004 701/25 |
| 2012/0296529 A1* | 11/2012 | Peake | .................. | A01B 69/008 701/50 |
| 2013/0048323 A1* | 2/2013 | Hake | ..................... | A01B 21/08 172/581 |
| 2013/0173116 A1* | 7/2013 | Gustafson | ............ | A01B 69/004 701/41 |
| 2013/0211658 A1* | 8/2013 | Bonefas | ................ | B65G 67/24 701/28 |
| 2013/0211675 A1* | 8/2013 | Bonefas | ................ | B62D 12/02 701/41 |

\* cited by examiner

AGRICULTURAL IMPLEMENT MOUNTING

BACKGROUND

Field of Invention

The present invention relates to the attachment of working implements to agricultural vehicles, and in particular to methods for the attachment which may be implemented where the vehicle is equipped with a mounting hitch or similar connector which hitch is movable relative to the vehicle, and further to an agricultural vehicle having such a hitch and a control system for at least partially automated control of the hitch.

Description of Related Art

An example of such a movable hitch is described in International Patent application WO 90/06240 and comprises a towing hook attached at one end of a towing bar, with the other end of the towing bar slideably mounted in a frame. The hitch frame is pivotably mounted to the chassis of a tractor and enables the towing hook to be raised or lowered by rotating the frame up or down about the pivoting mount. The towing hook is further movable towards and away from the vehicle chassis by operation of a hydraulic cylinder which controls the sliding movement of the towing bar within the frame. Further examples of such movable hitches are described in German Patent application DE 100 65 161 A1 and European Patent application EP 1 428 696 A1.

It will be understood that the form of connecting means will be determined by the configuration of implement that is to be coupled. For example, a rigid transverse beam with spaced connectors may be used for semi-mounted implements, such as certain configurations of plough, whereas a quick release hook or a ball hitch coupling may be used for towed implements such as sprayers or balers. The term "connection hitch" as used herein is intended to encompass all such arrangements.

One particular benefit of having a movable connection hitch arises in the connection or mounting of implements, whereby small adjustments in the relative position of tractor and implement to align for connection may be made by moving the hitch rather than the whole tractor.

A downside of having a movable connection hitch is in terms of managing axle loading. If an implement is mounted on the hitch at the furthest extent of its movement away from the vehicle rear axle, the extra leverage about the axis of the rear axle will lead to the front axle raising and hence require additional front-mounted weights to counterbalance the implement. If, on the other hand, the hitch is brought in to its closest position to the rear axle, there is a risk of the implement fouling the rear wheels, especially during turning.

SUMMARY

In accordance with a first aspect of the invention, there is provided an agricultural vehicle having an implement connection hitch including means for controllably moving the same relative to a rear axle of the vehicle. The vehicle has a control system controlling movement of the connection hitch and a position determining means coupled with the control system and operable to determine a location for the vehicle. The control system is arranged to maintain a first operating position of the hitch relatively close to the rear axle whilst the vehicle traverses a first, substantially straight, path whilst operating an attached implement. The control system identifies by reference to the position determining means the start of a second, curved, path to be traversed by vehicle and implement, and moves the hitch rearwards away from the rear axle of the vehicle and laterally parallel to the axis of the rear axle until it reaches a second operating position offset rearwards and laterally from the first such as to reduce the turning circle of the combined vehicle and implement during traversal of the second path.

Further in accordance with the invention there is provided, in an agricultural vehicle having an implement connection hitch moveably mounted adjacent a rear axle of the vehicle, a method of operating an implement coupled to the hitch including attaching said implement to the hitch at a first operating position of the hitch relatively close to the rear axle, and traversing a first, substantially straight, path whilst operating the implement. The method further includes identifying the start of a second, curved, path to be traversed by vehicle and implement and moving the hitch rearwards of the vehicle away from the said rear axle and laterally parallel to the axis of the rear axle until it reaches a predetermined distance offset from a front to rear centreline of the vehicle until it reaches a second operating position rearwards and laterally offset from the first such as to reduce the turning circle of the combined vehicle and implement, and traversing the second path.

By moving the hitch laterally and rearward relative to the rear axle as the vehicle goes into a turning path, for example a headland turn, the risk of the implement fouling the rear wheels of the vehicle is reduced, whilst enabling an optimum close position for axle loading during the operating (first) path. Identifying an attached implement to the vehicle control system may enable automated determination of optimum locations relative to the rear axle for the first and second operating positions.

Further features of the present invention are recited in the attached claims, to which reference is now made, and/or will become apparent from the following description of example embodiments.

BRIEF DESCRIPTION OF THE DRAWINGS

The present invention will now be described, by way of example only, with reference to the accompanying drawings in which.

DETAILED DESCRIPTION

Figure 1:
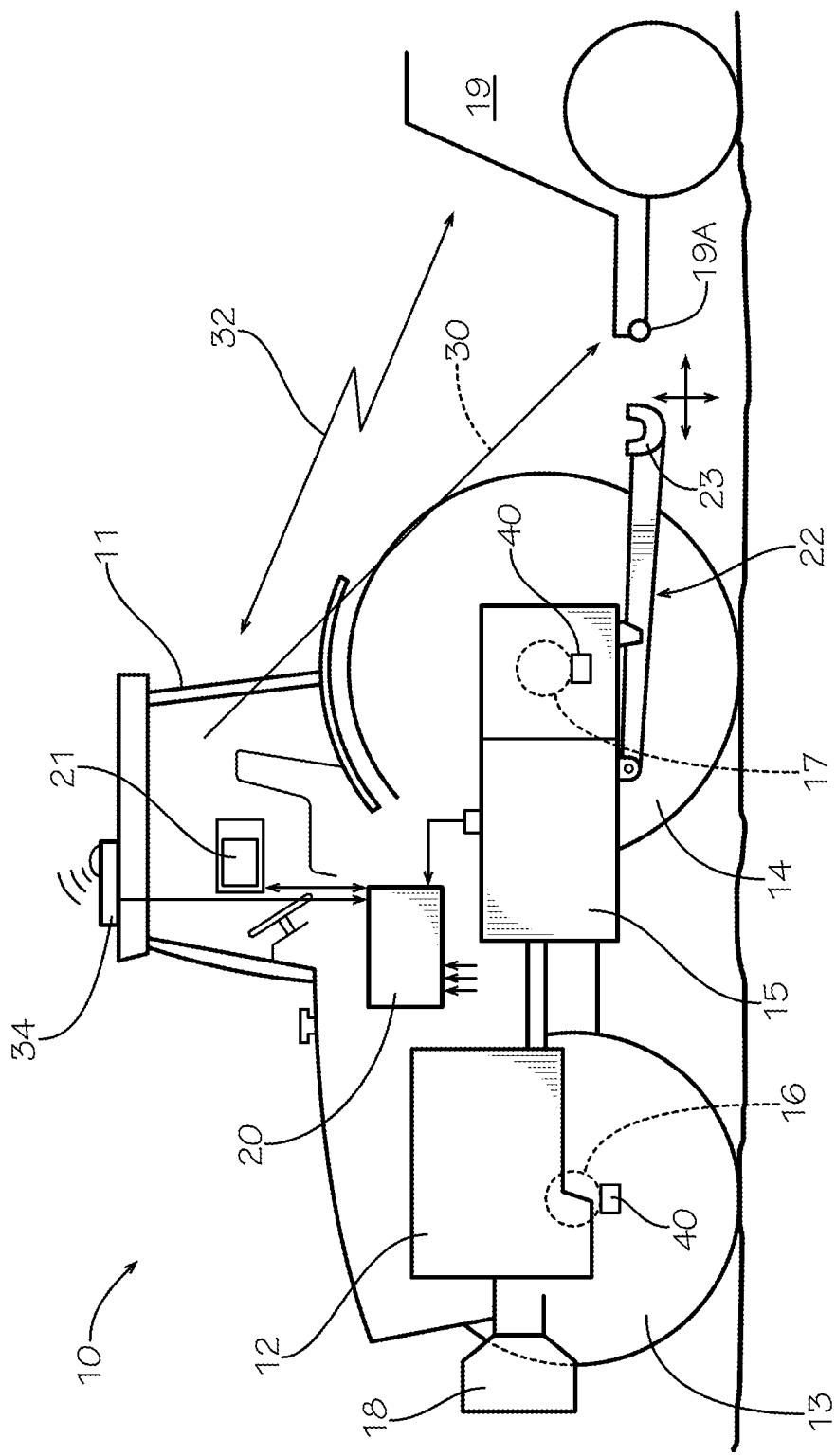
FIG. 1 shows a schematic view of a tractor having a controllably movable implement connection hitch.

Referring initially to FIG. 1 of the drawings, a tractor 10 has a cab 11 and engine 12 which drives front and rear wheels 13 and 14 via a transmission represented at 15. The engine powers other (not shown) components of the tractor such as an engine cooling fan, hydraulic pumps, air compressors and an electrical generator. The front wheels 13 are mounted on a front axle indicated at 16 and rear wheels 14 on a rear axle indicated at 17. A front weight 18 is mounted on a weight support attached to the front of the tractor chassis: as will be described in further detail below, the amount of weight applied to the front of the vehicle will be determined at least in part by the characteristics of an implement 19 to be coupled at the rear of the tractor 10.

Mounted within the cab 11 is a tractor control system which includes a processing unit 20 and a display terminal 21, which terminal utilises touch-screen technology and/or a plurality of discrete control devices (switches, buttons etc.) to also act as an input device for the control system. The control system also comprises a guidance system, incorporating a GPS receiver 34 or similar, which may provide simple navigational information via the display terminal 21, or which may be a more complex system including path planning and/or auto-steering functionality.

At the rear of the tractor, below the back axle 17, there is mounted a movable connection hitch assembly 22 having at its rearward end a coupling 23 for the implement 19 to be connected. In the embodiment of FIG. 1, the coupling is a transverse bar having a pair of spaced apart quick-coupling hooks replicating the position of the distal ends of the lower links of a three-point linkage and providing a means for coupling an implement for semi-mounted operation. The connection hitch assembly is controllably operable to move the coupling in three dimensions:

1. longitudinally towards and away from the rear axle generally in a direction parallel to the direction of travel of the tractor;
2. vertically up and down relative to the surface on which the tractor is standing; and
3. laterally either side of a longitudinal centre line of the tractor.

Figure 2:
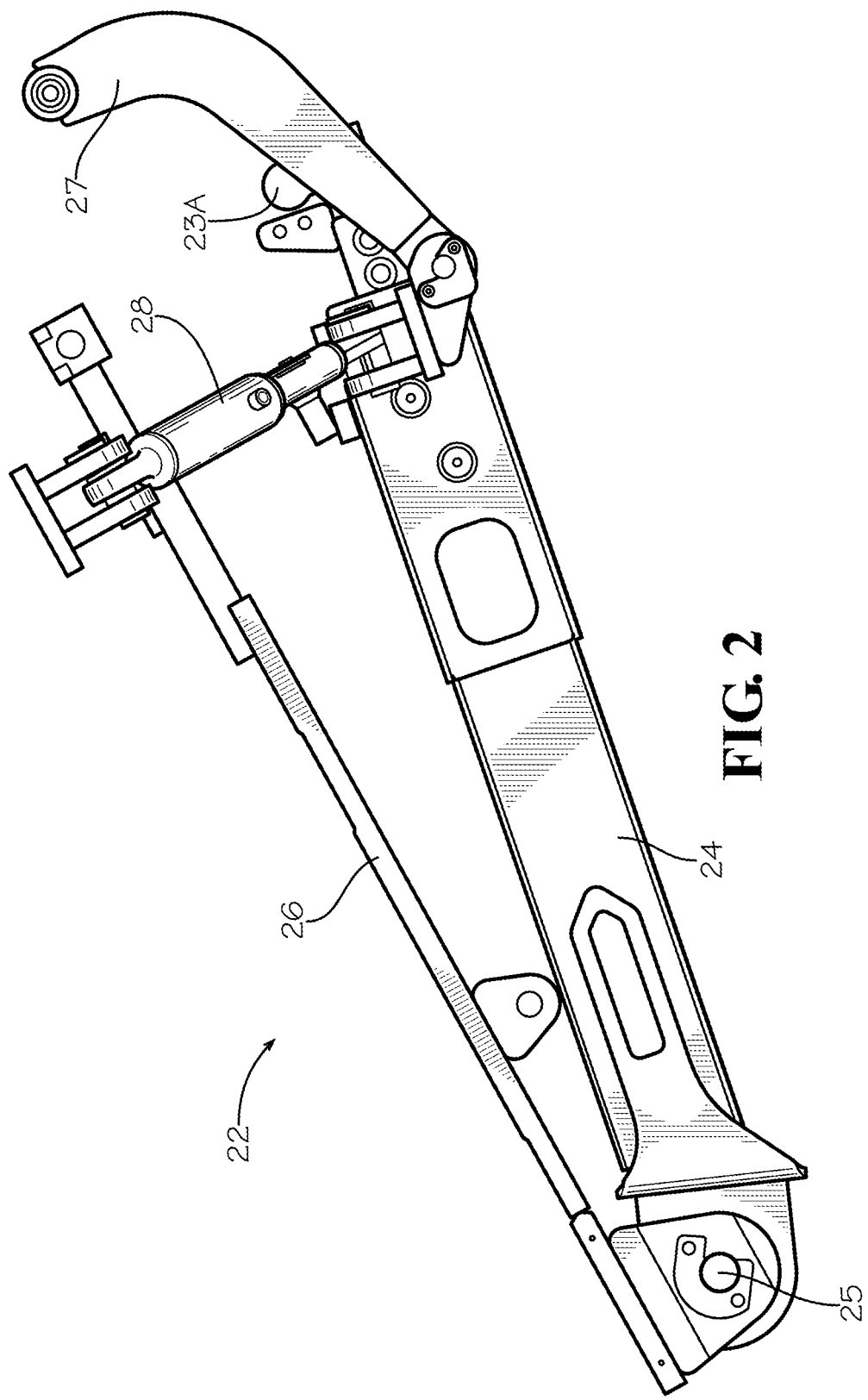
FIG. 2 is a perspective view of an example of movable implement connection hitch demounted from a tractor.

FIG. 2 shows in greater detail an embodiment of movable connection hitch assembly 22 demounted from the tractor 10. The embodiment differs slightly with respect to FIG. 1 in that transverse bar and hook coupling 23 is replaced by a ball hitch 23A.

The main component of the connection hitch assembly is a telescopically extendible body 24 which may be extended or contracted by means of a hydraulic cylinder (not shown) within the body. At the end opposite to the ball hitch connector 23A there is a swinging connection 25 by means of which the body 24 is pivotably coupled to a belly plate 26, which plate 26 is coupled to the chassis of the tractor to mount the connection hitch assembly. As will be recognised, the belly plate 26 may be omitted and the swinging connection 25 may be mounted direct to the chassis.

A pair of lift arms 27 are pivotably coupled at either side of the body 24 with their respective free ends being coupled to hydraulic cylinders (not shown) at the rear of the tractor, which arrangement is operable to raise and lower the connector 23A by causing the body 24 to pivot about the connection 25. Movement of the connector 23A in the lateral direction is provided by a pair of hydraulic cylinders 28 each pivotably coupled at a first end to the body 24 and at the other end to the tractor chassis. Controlled extension of one of the cylinders 28 (with corresponding contraction of the other) causes the body 24 to pivot in a substantially horizontal plane about the swinging connection 25. With control of all the cylinders, the lateral, longitudinal and vertical position of the connector 23A relative to the rear axle (17; FIG. 1) may be set.

Referring to FIGS. 3A to 3D, and additionally to the flow chart of FIG. 4, a method of operating the implement 19 coupled to the movable hitch 23A of tractor 10 will now be described.

The process begins at step 80 with the attachment of the implement 19 to the hitch at a first operating position 70 of the hitch. As represented in FIG. 3A, operating position 70 is relatively close to the rear axle (17; FIG. 1) of the tractor 10 to minimise the lifting effect of the implement weight on the tractor front wheels.

Next in the process is an optional step 82 of identifying the implement 19 to the control system of the tractor 10. The identification of the implement to the control system processing unit 20 enables the control system to determine various positioning parameters for the hitch, as will be described below, including the optimum location for the first operating position 70 for a given implement. This identification may be achieved by means of a wired or wireless signal (represented by arrow 32 in FIG. 1) according to the ISOBUS standard and sent from implement 19 to tractor 10, or the identity may be input by the operator via display terminal 21. The identification may comprise a simple make/model number, or a menu selection from a list of the operator's available implements.

At step 84, and still as at FIG. 3A, the tractor 10 traverses a first, substantially straight, path P1 whilst operating the implement 19. This first path P1 may be a segment of guidance map directing the path of the tractor and implement within a field, for example, under control of the guidance system, incorporating GPS receiver 34.

At step 86, the start of a second, curved, path PH to be traversed by tractor 10 and implement 19 is identified, again suitably by reference to the GPS receiver 34 of the guidance system. As will be understood, this second path PH may comprise a headland turn manoeuvre linking a pair of substantially straight guidance map path sections, or it may simply comprise a curved portion of path.

Figure 3B:
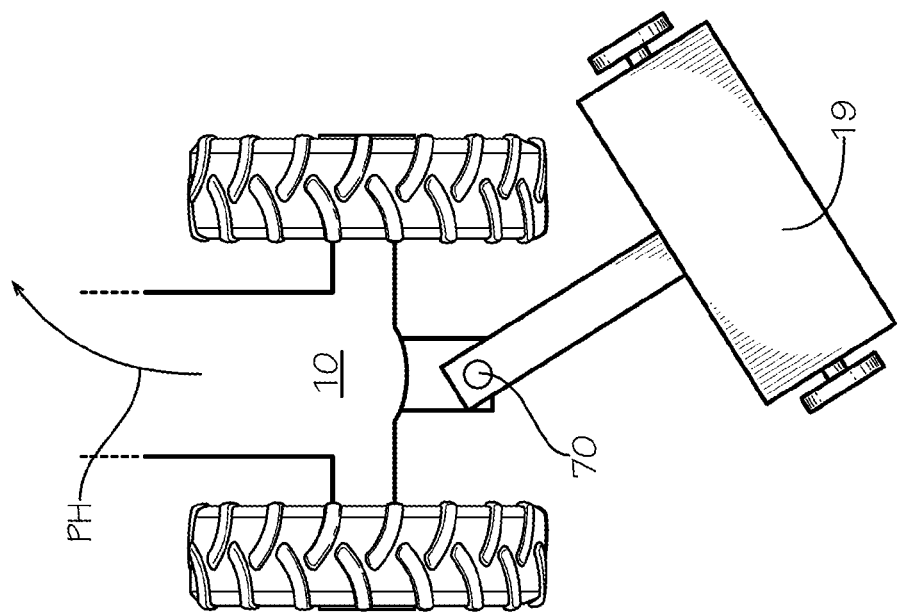
FIGS. 3A-3D represent the variation of vehicle plus implement turning circle where a variable position implement hitch is provided.
Figure 3A:
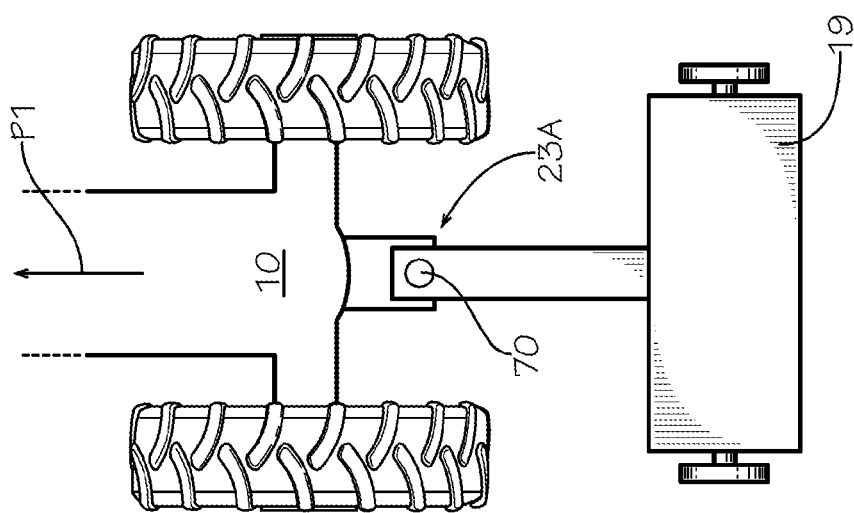
Figure 3D:
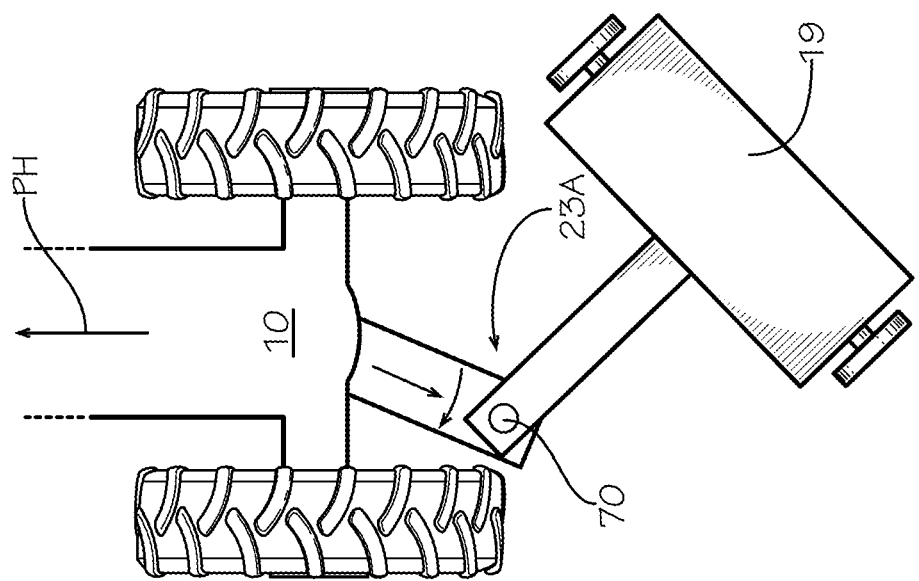
Figure 3C:
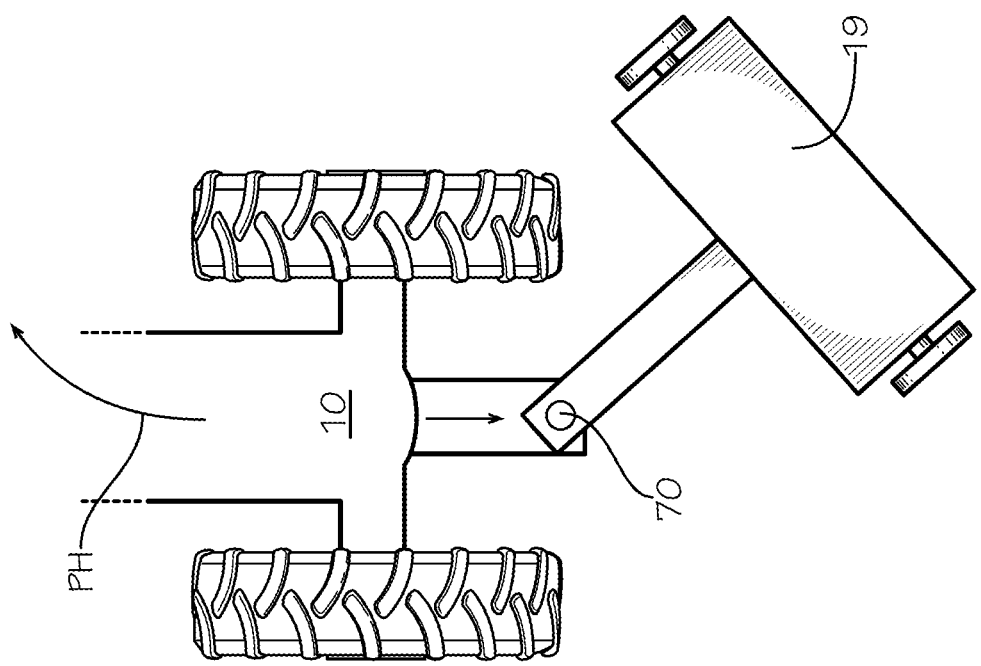
Figure 4:
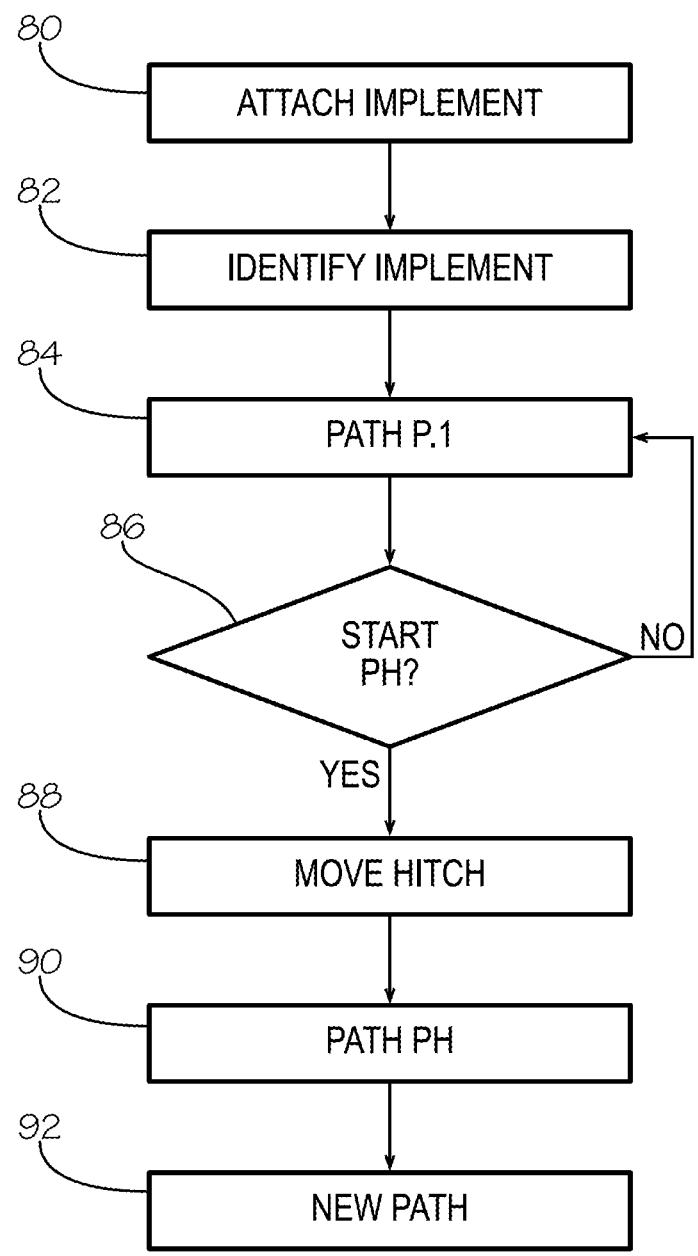
FIG. 4 is a flow chart representation of a method of operating an implement according to the present invention.

As shown in FIG. 3B, with the hitch in operating position 70, as the tractor 10 turns to follow path PH, the implement 19 would come close to fouling the rear wheels for a relatively shallow turn angle. Recognising that a smaller turning radius is desirable (especially for headland turns), at step 88 the process comprises moving the hitch relative to the rear axle of the tractor until it reaches a second operating position 71 offset from the first position 70, such as to reduce the turning circle of the tractor and implement combination, prior to traversing the second path PH at step 90. As shown in FIG. 3C, the second operating position 71 of the hitch may result from simply extending the hitch assembly 22 rearward of the tractor 10 to enable tighter turns before the implement 19 fouls the tractor wheels. Alternately, the second operating position may result from moving the hitch laterally (substantially parallel to the axis of the tractor rear axle) towards the outside of the turn or, as shown in FIG. 3D, second operating position 71 may result from both lateral and rearward movement to give the tightest turning circle.

Where the optional step (82; FIG. 4) of identifying the implement has been made, the processor unit 20 of the tractor control system is suitably configured to derive or look up data defining the optimum location for second operating position 71 relative to the tractor rear axle, and to automatically move the hitch to this position on identification of a headland turn or other second path.

A final stage in the process is the identification of the end of second path PH and the commencement of a new path section, at step 92. Where the new path section is substantially straight, this step may comprise returning the hitch to the first operating position 70 (as in FIG. 3A) or, as will be described below, a third operating position for the hitch may be taken.

Figure 6:
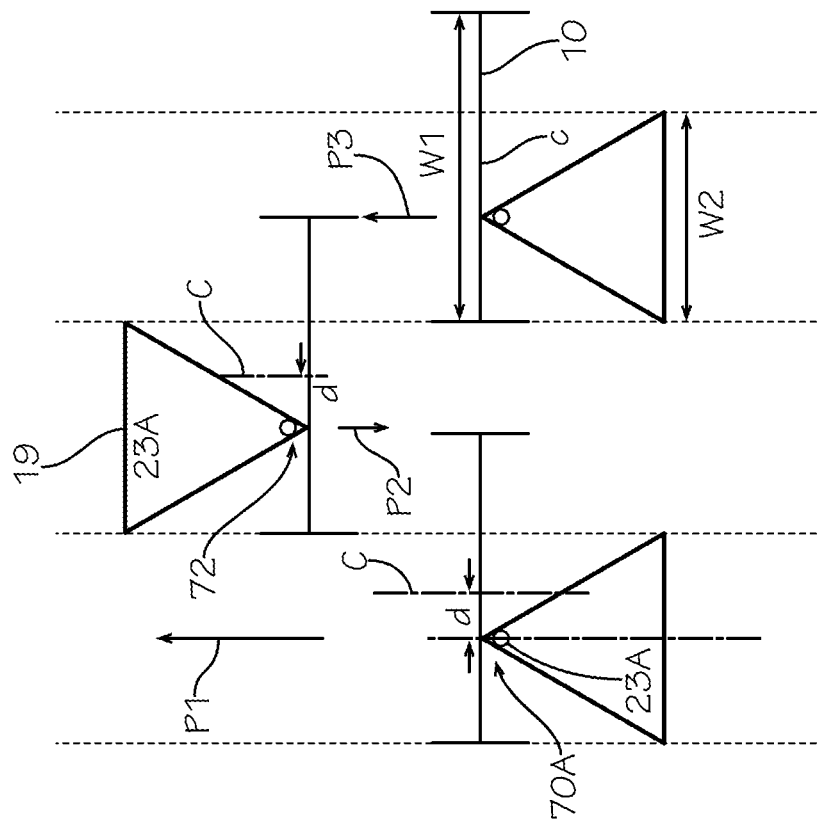
FIG. 6 schematically represents the towing of an implement having a narrower effective width than the width of the towing vehicle, which vehicle has a laterally movable implement connection hitch.
Figure 5:
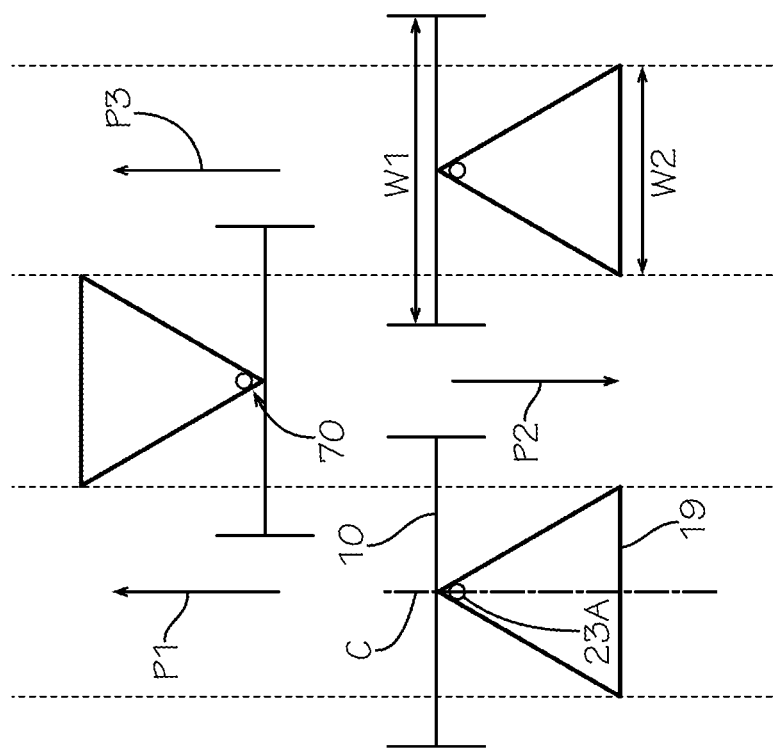
FIG. 5 schematically represents the towing of an implement having a narrower effective width than the width of the towing vehicle, which vehicle has a laterally fixed implement connection hitch.

FIGS. 5 and 6 represent the towing of implement 19 behind tractor 10 on a series of parallel field paths P1, P2, P3, with a headland manoeuvre (not shown) between each. The tractor has a width W1 and the implement has an effective operating width W2, where W2<W1. In the example of FIG. 5, the towing hitch remains fixed at the first operating position 70 on the centreline C of the tractor 10 for all non-headland paths, which leads to problems. The separation of the paths P1, P2, P3 is determined as the effective width W2 of the implement such that the surface of the field is covered once without gapping or overlapping of the paths. Looking at path P2, it can be seen that to traverse this, the wheels on one side of the tractor 10 will be running over the area covered by path P1. With some implements this may not be too serious, but with an implement such as a plough, this driving on an already ploughed surface will lead to unacceptable soil compaction. The same occurs during path P3 where the area covered by path P2 is driven upon.

Figure 7:
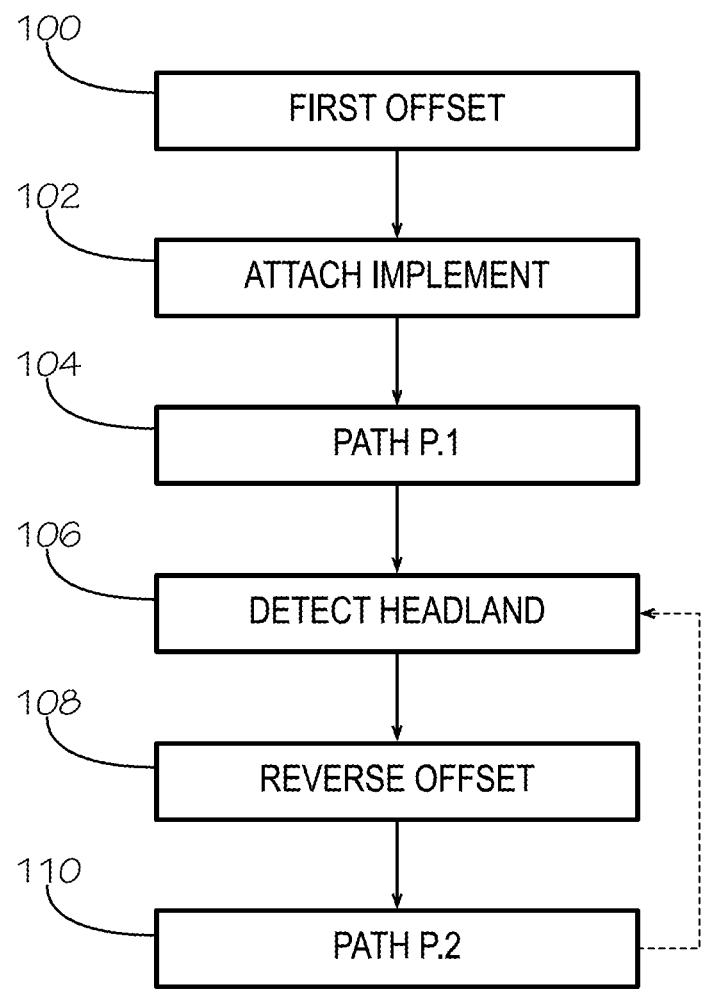
FIG. 7 is a flow chart representation of further optional aspects of a method of operating an implement according to the present invention.

Referring to FIG. 6, and additionally to the flow chart of FIG. 7, further optional features of a method of operating the implement 19 coupled to the hitch 23A of tractor 10 will now be described.

The process starts at step 100 with the operator actuating a control (21; FIG. 1) in the tractor cab which causes the connection hitch mechanism to move the hitch laterally generally parallel to the axis of the rear axle of the tractor until it reaches a predetermined distance offset d from the front to rear centreline C of the tractor. This provides the first operating position 70A. The extent of offset distance d may be determined by the effective width W2 of the implement 19 (in this example d=W2/4) or it may be selected such as to align one edge of the implement with the wheels on one side of the tractor.

At step 102, the implement 19 is coupled to the hitch 23A. As will be recognised, this step may precede step 100 although this may not be desirable if the tractor is stationary as the lateral loading on the hitch mechanism may prove excessive.

Step 104 comprises traversing the first path P1 whilst operating the implement.

The end of path P1 is identified at step 106. This may be a simple input from the operator via the cab controls to identify entry to a headland area to the tractor control system, or it may be determined automatically by the guidance system using GPS receiver 34 (FIG. 1). Steering angle sensors coupled with the front axle may also, or additionally, be used to determine when a tractor enters a headland manoeuvre.

At the end of path P1, and during or following the traversal of the turning/headland path PH (FIG. 3B-3D), the hitch is moved laterally generally parallel to the axis of the rear axle of the tractor until it reaches the offset distance d on the opposite side of the tractor centreline C, in step 108. This provides the third operating position 72.

Step 110 comprises traversing the second path P2 parallel and in the opposite direction to the first P1 and laterally spaced from it by a distance derived from the predetermined offset d (which is itself related to the effective width W2 of the implement which also equals the path separation).

Steps 106, 108 and 110 are then repeated for subsequent paths P3.

The particular benefit of this mode of operation may be seen by comparing the traversal of path P2 in FIGS. 5 and 6. In the fixed arrangement of FIG. 5, the wheels on one side of the tractor are running across the area covered by the implement during P1 giving compaction problems as discussed above. In the arrangement of FIG. 6, the applied offset allows the tractor wheels to align with the edge of the area covered during P1 which not only reduces compaction issues, it makes it easier for the operator if steering by reference to P1 rather than relying on auto-guidance.

The identification of the implement to the control system processing unit 20 enables the control system to determine the extent of the offset d.

As will be recognised, variations are possible to the above described apparatus and method. Although the exemplary embodiments refer to a tractor, it will be readily understood that the present invention is applicable to any agricultural vehicle having an implement connection hitch.

In the foregoing, the applicants have described an agricultural vehicle having an implement connection hitch including means for controllably moving the same relative to a rear axle of the vehicle. A control system controlling movement of the connection hitch is coupled with position determining means such as a GPS receiver and determines a location for the vehicle. During turning manoeuvres, the control system moves the hitch relative to the rear axle of the vehicle until it reaches an offset position such as to reduce the turning circle of the vehicle and a connected implement. The extent of offset may be determined automatically by the control system on identification of a connected implement.

The invention claimed is:

1. An agricultural vehicle comprising:
   an implement connection hitch which is moveable relative to an axis defined by a rear axle of the agricultural vehicle;
   a hitch control system controlling movement of the implement connection hitch; and
   an agricultural vehicle position determining system coupled with the hitch control system and operable to determine a location for the agricultural vehicle;
   wherein the hitch control system is arranged to:
   maintain a first operating position of the implement connection hitch relatively close to the rear axle of the agricultural vehicle whilst the agricultural vehicle traverses a first, straight, path whilst operating an attached implement;
   identify by reference to the agricultural vehicle position determining system, a start of a second, curved, path to be traversed by the agricultural vehicle and the attached implement; and
   move the implement connection hitch rearwards away from the rear axle of the agricultural vehicle and laterally parallel to the axis defined by the rear axle until the implement connection hitch reaches a second operating position offset rearwards and laterally from a first operating position of the implement connection hitch such as to reduce a turning circle of the agricultural vehicle and attached implement during traversal of the second curved path; wherein at an end of the second curved path, the hitch control system is rearranged to:
   move the implement connection hitch relative to the rear axle of the agricultural vehicle until the implement connection hitch reaches a third operating position, offset from the first and second operating positions of the implement connection hitch.

2. The agricultural vehicle as claimed in claim 1, wherein the hitch control system is configured to determine the second operating position of the implement connection hitch at least partly by reference to data identifying the attached implement.

3. The agricultural vehicle as claimed in claim 2, further comprising an ISOBUS connection to the hitch control system, wherein the hitch control system is arranged to receive data identifying an implement connected to the agricultural vehicle via the ISOBUS connection.

4. The agricultural vehicle as claimed in claim 3, wherein the ISOBUS connection is a wireless connection.

5. The agricultural vehicle as claimed in claim 2, further comprising a vehicle cab, wherein the vehicle cab contains a user operable input device by which an operator of the agricultural vehicle may input the identity of a connected implement to the hitch control system.

6. The agricultural vehicle as claimed in claim 1, wherein the position determining system comprises a GPS receiver.

7. The agricultural vehicle as claimed in claim 1, wherein the hitch control system is configured to determine the first operating position of the implement connection hitch at least partly by reference to data identifying an axle loading of a front axle, the rear axle, or the combined axle loading of the front and rear axles of the agricultural vehicle.

8. In an agricultural vehicle having an implement connection hitch moveably mounted adjacent a rear axle of the agricultural vehicle, the rear axle defining an axis, a method of operating an implement coupled to the implement connection hitch comprising:
attaching an implement to the implement connection hitch at a first operating position of the implement connection hitch relatively close to the rear axle;
traversing a first, straight, path whilst operating the agricultural vehicle and attached implement;
identifying a start of a second, curved, path to be traversed by the agricultural vehicle and attached implement;
moving the implement connection hitch rearwards of the agricultural vehicle away from the rear axle and laterally parallel to the axis of the rear axle of the agricultural vehicle until the implement connection hitch reaches a predetermined distance offset from a front to rear centreline of the agricultural vehicle, defined as a second operating position rearwards and laterally offset from the first operating position of the implement connection hitch such as to reduce a turning circle of the agricultural vehicle and attached implement;
traversing the second, curved path,
and moving the implement connection hitch relative to the rear axle of the agricultural vehicle until the implement connection hitch reaches a third operating position offset from the first and second operating positions of the implement connection hitch, at an end of the second curved path.

9. The method as claimed in claim 8, wherein the second operating position of the implement connection hitch is determined at least partly by an identity of the attached implement.

10. The method as claimed in claim 8, wherein each of the first and third hitch operating positions comprises a predetermined lateral offset from a front to rear centreline of the agricultural vehicle, with the first and third hitch operating positions being disposed on opposite sides of the front to rear centreline of the agricultural vehicle.

11. The method as claimed in claim 8, wherein the agricultural vehicle further comprises a vehicle cab, wherein the step of attaching said implement to the implement connection hitch at a first operating position of the implement connection hitch comprises:
actuating a control in the vehicle cab and thereby causing a mechanism of the agricultural vehicle to move the implement connection hitch rearward from the agricultural vehicle until it reaches a distance from the rear axle at which it is visible to an operator in the vehicle cab;
attaching the implement to the implement connection hitch; and
retracting the implement connection hitch and attached implement toward the rear axle and under control of the agricultural vehicle to a position at a distance from the rear axle determined at least partly by an identity of the attached implement.

12. The method according to claim 11, wherein the said position at a distance from the rear axle is the first operating position of the implement connection hitch and is further determined by an axle loading of a front axle, the rear axle, or the combined axle loading of the front and rear axles of the agricultural vehicle.

13. The method according to claim 9, wherein an identity of the attached implement is signaled to the agricultural vehicle by an ISOBUS connection between the attached implement and the agricultural vehicle.

14. The method according to claim 9, wherein an identity of the attached implement is input to the agricultural vehicle by an operator in a cab of the agricultural vehicle.

15. The method as claimed in claim 8, wherein the second curved path is a headland turn.

* * * * *